United States Patent [19]

Hsu

[11] Patent Number: 4,994,255
[45] Date of Patent: Feb. 19, 1991

[54] OXIDATION OF FERROUS CHLORIDE DIRECTLY TO CHLORINE IN A FLUID BED REACTOR

[75] Inventor: Charles K. Hsu, Millersville, Md.

[73] Assignee: SCM Chemicals, Inc., Baltimore, Md.

[21] Appl. No.: 344,699

[22] Filed: Apr. 28, 1989

Related U.S. Application Data

[63] Continuation of Ser. No. 141,951, Jan. 11, 1988, abandoned, which is a continuation-in-part of Ser. No. 888,693, Jul. 24, 1986, abandoned.

[51] Int. Cl.$^5$ ............................................... C01B 7/03
[52] U.S. Cl. .................................... 423/500; 423/493; 423/402; 423/633
[58] Field of Search ............... 423/500, 493, 502, 633, 423/148, 138, 72, 74, 80

[56] References Cited

U.S. PATENT DOCUMENTS

| | | | |
|---|---|---|---|
| 1,946,325 | 2/1934 | Levy | 423/46 |
| 3,092,456 | 6/1963 | Nelson et al. | 423/500 |
| 3,325,252 | 6/1967 | Wikswo et al. | 423/500 |
| 3,793,444 | 2/1974 | Reeves et al. | 423/502 |
| 3,989,510 | 11/1976 | Othmer | 423/84 |
| 4,060,584 | 11/1977 | Hartmann et al. | 423/149 |
| 4,174,381 | 11/1979 | Reeves et al. | 423/502 |
| 4,436,681 | 3/1984 | Barczak et al. | 423/633 |
| 4,576,636 | 3/1986 | Robinson et al. | 423/63 |
| 4,615,874 | 10/1986 | Olsen | 423/500 |

Primary Examiner—Anthony McFarlane
Attorney, Agent, or Firm—Lieberman Rudolph & Nowak

[57] ABSTRACT

A process for recovering elemental chlorine from ferrous chloride produced during chlorination of a titaniferous ore or ore beneficiate by oxidizing ferrous chloride in a fluidized bed of particulate material which is inert, e.g., sand, continuously oxidizing first to ferric chloride and then to ferric oxide as one stage.

8 Claims, 5 Drawing Sheets

OXIDATION OF FERROUS CHLORIDE DIRECTLY TO CHLORINE IN A FLUID BED REACTOR

The present application is a continuation of U.S. Ser. No. 141,951, filed Jan. 11, 1988, now abandoned, which in turn is a continuation-in-part of U.S. Ser. No. 888,793, filed July 24, 1986, now abandoned. The disclosures of these earlier applications are hereby incorporated by reference in their entireties into the present disclosure.

This invention relates as indicated to a process for the direct oxidation of ferrous chloride to elemental chlorine in a fluid bed type reactor.

BACKGROUND OF THE INVENTION AND PRIOR ART

The chlorination and beneficiation of titaniferous ores by chloride processes produce iron chlorides as a by-product. The chlorine gas which is used to effect the chlorination may be recovered from the ferrous chloride by oxidation to chlorine gas which can be recycled back to the chlorinator or beneficiator reactors.

Where the titaniferous ore is chlorinated only to the extent necessary to remove iron as iron chloride (ferrous and/or ferric) and the titanium dioxide remains substantially unchanged, this process is called "beneficiation". Where the titaniferous ore is chlorinated under conditions sufficient to yield titanium tetrachloride as an end product, this process is understood as a "direct" chlorination process leading ultimately to the production of titanium dioxide. In either case, ferrous and/or ferric chloride are produced. The chlorinating agent in either case is elemental chlorine.

When the ferrous chloride ($FeCl_2$) is condensed and separated from the off-gas of an entrained flow chlorinator, a chlorinator, or beneficiator, only a small amount of unburned carbon remains with the solid ferrous chlorides. If an indirect heat transfer means is used for separating the chlorine, plugging by iron chlorides can result. Accordingly, all heating and cooling are by a direct method.

In the process of the present invention, there is no special preparation of the fluid bed medium. This medium is formed of a particulate solid material which is inert to chlorine and ferrous chloride. A most convenient material is ordinary silica sand. Thus, the instant process avoids the high costs of material preparation and also stabilizes the reaction rate because of the consistency of the physical and chemical properties in a fluidized bed medium.

Problems are inherent in the oxidation of $FeCl_2$ or $FeCl_3$ to elemental chlorine. The main problem with the full oxidation of $FeCl_2$ or $FeCl_3$ to $Cl_2$ is that at low temperatures where the thermodynamics are favorable, the reaction is slow. At higher temperatures where the reaction proceeds at a practical rate, the thermodynamics are unfavorable and the reaction is far from complete.

Efforts to overcome this problem are disclosed by Dunn in U.S. Pat. Nos. 3,887,694 and 3,376,112; and in Bonsack U.S. Pat. Nos. 3,944,647 and 3,919,400. These patents teach the use of catalysts to speed up the reaction at lower temperatures where the thermodynamics are more favorable. Dunn in U.S. Pat. No. 3,865,920 and Bonsack in U.S. Pat. No. 4,094,854 also suggest systems operating at higher temperatures where unreacted $FeCl_3$ is separated and recycled back to the oxidation zone. Dunn in U.S. Pat. No. 3,865,920 also suggests the use of a very long "fuel pipe" in the oxidation zone discharge which pipe is held at a lower temperature.

Another severe problem with $FeCl_2$ or $FeCl_3$ oxidation to elemental chlorine is the formation of hard, dense $Fe_2O_3$ deposits on the inner walls especially near the oxidation zone discharge. Attempts to solve this problem were the subjects of Sawyer U.S. Pat. No. 2,642,339; Nelson Nos. 3,050,365 and 3,092,456; Reeves No. 3,793,444; and Mitsubishi No. 4,073,874.

Nelson, in No. 3,092,456 introduces carbon in the discharge line of the oxidizer. In Nelson's process the reaction is essentially complete. Moreover, Nelson is oxidizing iron chloride to chlorine in a gas-gas reaction rather than in a gas-solid reaction as used in the present invention.

U.S. Pat. No. 4,055,621 to Okudaira teaches a process for obtaining chlorine from iron chloride. Iron oxide is added to the iron chloride which is prepared by chlorinating iron-containing titanium ore, in an amount above 10% by weight of the resulting mixture and charging the mixture in solid phase into a fluidizing roasting furnace for oxidation. Any overflow is oxidized in a second reactor. The iron oxide thus obtained is recycled to the primary reactor for controlling the reaction temperature in the furnace.

U.S. Pat. No. 4,140,746 to Turner et al relates to the recovery of chlorine values from iron chloride produced from the chlorination of titaniferous material containing iron and particularly from the carbo-chlorination of ilmenite which, for example, can be the first stage in the so-called chloride route to form titanium dioxide pigment. The iron chloride which may be ferric chloride or ferrous chloride is subjected to a combination of reduction and oxidation reactions. In the reduction reaction, ferric chloride is dechlorinated to ferrous chloride by a reducing agent suitable for producing a chloride compound for recycling to the chlorination process. In the oxidation reaction ferrous chloride is oxidized to ferric oxide and ferric chloride. The ferric chloride is recycled to the reduction reaction. According to Turner, by this method the chlorine values are recovered from the by-product iron chloride by a route which avoids the difficult reaction between ferric chloride and oxygen to produce chlorine and ferric oxide.

U.S. Pat. Nos. 4,174,381 to Reeves et al teaches an improved process and an apparatus for producing chlorine and iron oxide in a multistage recirculating fluidized bed reactor wherein ferric chloride in the vapor phase is reacted with an excess of oxygen at temperatures from 550° to 800° C. The improvement comprises utilizing a reactor that includes an initial "dense" zone and a downstream "dilute zone". In the dense zone, a fuel is burned, reactants and recirculated iron oxide particles are heated, ferric chloride is vaporized and at least 50% of the ferric chloride is converted to chlorine and iron oxide. In the downstream dilute zone, the conversion of ferric chloride is continued to greater than 95% completion.

European Patent publication No. 5054 discloses a process for the preparation of micaceous iron oxide which comprises reacting ferrous chloride substantially free from disruptive impurities, such as carbon, with oxygen at a temperature of 300° to 1200° C. The process can be carried out in a fluidized bed and it can form a part of a process for the recovery of chlorine values from iron chloride. The presence of carbon gives a nonmicaceous iron oxide. Also, a fluid bed reactor has disadvantages in that $Fe_2O_3$ cannot be discharged continuously as in a packed bed system, without entraining unreacted $FeCl_2$. This is because a fluid bed regime is a perfectly mixed reactor which makes separation of fresh feed and product impossible.

Another reference which relates to the recovery of iron oxide and chlorine by oxidation of iron chlorides is the patent to Hartmann U.S. Pat. No. 4,060,584. The invention described therein is directed specifically to the oxidation of chlorinator dust which is essentially ferrous chloride contaminated with coke and other metal chlorides and oxides. The amount of coke present in the chlorinator dust derived from the chlorination of ilmenite is about 23% to 25% by weight. Before the treatment in the oxidation reaction reactor, the temperature is elevated to 700° C. by burning carbon monoxide in oxygen and then the chlorinator dust is added. During reaction the temperature reaches 750° C., and afterwards the solid/gas mixture is separated in a cyclone separator. The resulting solid mixture showed a coke content of 53.8%. Hartmann states of his process at column 3, line 24, "Since the reaction is carried out at relatively low temperatures, i.e., 500° to 800° C., combustible secondary constituents of the chlorinator dust, such as carbon, are definitely not oxidized". This avoids sintering of the iron oxide and enables easy control of the reaction. Hartmann describes a total chlorination procedure instead of a selective chlorination procedure. In a selective procedure the amount of carbon present in the reaction mass is much less than in chlorinator dust from a total chlorination process.

In a beneficiation process taught by V. G. Neurrgandnkar, Journal Chem. Tech. Biotechnol, 1986, 36, 27–30, the carbon to ilmenite ratio is 8%. In a total chlorination reaction the ratio is 20–30%. Thus, the carbon content in the off-gas in a beneficiation reaction is much lower than the carbon content in a total chlorination reaction. This is also true in an entrained flow chlorination such as that taught by Bonsack, supra. The carbon used in this case is reactive and thus much easier to burn and no carbon is left over. As described in "Mitsubishi Process for Upgrading Ilmenite and Chlorination Recirculation", S. Fukushima and Y. Sugawara, p. 453, the ratio of carbon to ilmenite is 8% in such a reaction.

Other references relating to beneficiation and entrained flow chlorination teach carbon/ilmenite ratios of less than 20%. These include U.S. Pat. No. 4,343,775 and U.S. Pat. No. 4,094,954 to Bonsack; U.S. Pat. No. 4,389,391 to Dunn; U.S. Pat. No. 4,046,853 to Robinson; and a total chlorination process by described by Robinson in U.S. Pat. No. 4,624,843 which teaches about 7.5%, but preferably less than 12.5% carbon/ilmenite ratio.

As taught in the references cited above, the carbon content in condensed iron chloride is much lower in beneficiation processes than in total chlorination processes because beneficiation is usually run at a carbon deficiency condition. The carbon content in iron chloride condensed from entrained flow chlorination is much lower than that resulting from conventional chlorination processes which yield chlorinator dust, because the highly reactive carbon tends to be burned out entirely. Entrained flow chlorination yields only "left over" carbon, not blowover carbon as in a fluid bed reactor. The carbon/ilmenite ratio is lower in an entrained flow chlorinator.

In the case of condensed ferrous chloride from a total chlorinator, e.g., a fluidized bed chlorinator, the carbon content must be reduced from the normal 20 to 25% by weight. The carbon, together with any ore in the off-gas stream can be separated by conventional separation methods, such as using a hot cyclone separator, electrostatic precipitator (U.S. Pat. No. 4,094,954) or a "knock out pot". This removal can be effected at temperatures above the melting point of ferrous chloride (674° C.). The carbon and ore solids can be most efficiently removed from a hot gas stream by using a ceramic fiber bag in a baghouse. The temperature can be as high as 800° C. The carbon content in the condensed $FeCl_2$ under these conditions is below about 12% and usually, the removal of carbon and ore is almost complete. If the collection is good, the carbon and ore are isolated with good separation before the ferrous chloride condenses.

The carbon content in the condensed ferrous chloride solid is then burned with oxygen to supply heat required to keep the fluidized bed medium hot, and to supply heat lost through the wall of the reactor. The presence of too much carbon in the ferrous chloride-containing mixture from a total chlorinator is undesirable because it consumes too much oxygen in burning and forms too high a concentration of carbon dioxide. This reduces the chlorine concentration. If chlorine containing excessive $CO_2$ is returned to the fluidized bed chlorinator, carbon needed for the reaction is consumed because under these conditions, carbon dioxide in the recycle gas reacts with carbon to form carbon monoxide. The whole process is, therefore, rendered less efficient and hence it is preferred practice to lower the carbon dioxide content in the recycle gas by keeping the carbon content of the condensed ferrous chloride/carbon mixture preferably less than 12%.

As can be seen from the prior art above, in various methods for chlorinating titaniferous materials, e.g., ilmenite, rutile, and titaniferous slags, to produce $TiCl_4$ and iron chlorides, chlorine is generally the chlorinating agent, and chlorine is recovered from iron chlorides by oxidation to $Cl_2$ and $Fe_2O_3$.

BRIEF STATEMENT OF THE INVENTION

The present invention is a process for the recovery of elemental chlorine from ferrous chloride from chlorinators used in entrained flow chlorination or in beneficiation, or from a fluidized bed chlorinator, which comprises the steps of introducing solid particulate ferrous chloride containing less than 12% by weight of carbon into a reactor containing a fluidized bed of solid particulate material, which material is inert to chlorine. The inert material has a particle size in the range of from −100 mesh to +250 mesh. Under the oxidation conditions, the ferrous chloride is oxidized to elemental chlorine and ferric oxide with an oxygen-containing gas at a temperature below the melting point of ferrous chloride but above 500° C. The elemental chlorine gas is then isolated from the off-gases exiting from the reactor. Ferric oxide adhering to inert particulate material may be continuously removed by segregating a portion of the inert particulate material with the ferric oxide attached to the surface thereof and supplying fresh inert particulate material to the reactor. Also, the ferric oxide may be removed in the form of discrete particles by centrifugal means from the off-gases at a temperature above the dew point of ferric chloride.

BRIEF DESCRIPTION OF THE DRAWINGS

The invention may be better understood by referring to the annexed drawings wherein.

DETAILED DESCRIPTION OF THE INVENTION

Figure 1:
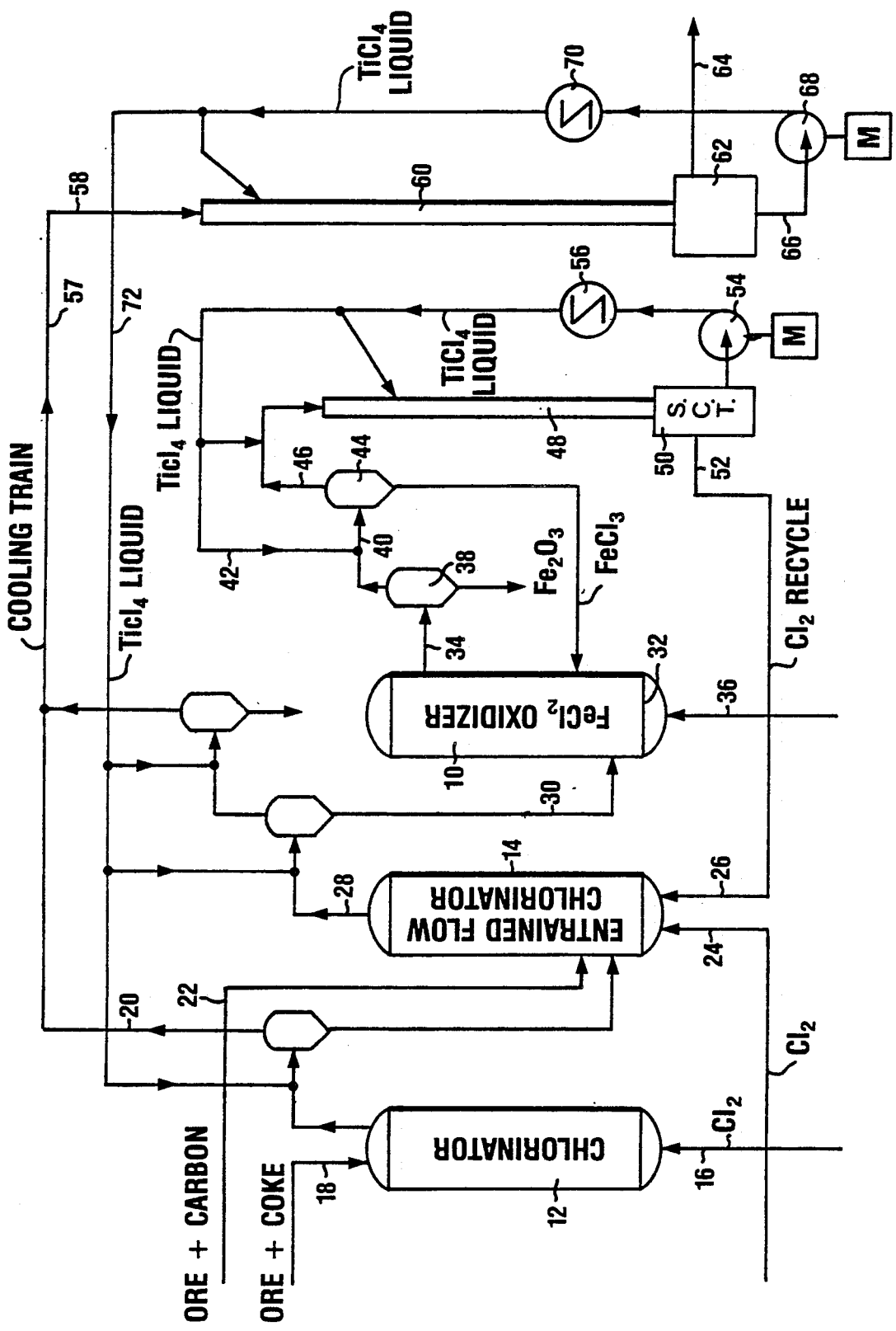
FIG. 1 is a diagrammatic and schematic illustration of an apparatus utilizing a ferrous chloride oxidizer in combination with an entrained flow titaniferous ore chlorination process.

The process of the present invention is performed in a very simple fluidized bed reactor. Such a reactor is of conventional structure and is composed of a tube with inlet and outlet conduits and fitted with a perforated plate near the lower end of the vessel. The vessel is normally vertically disposed, i.e., with its longitudinal axis in a vertical attitude. Means for introducing an oxygen containing gas, e.g., air through the bottom inlet and the perforated plate are provided. The gas velocity is maintained at between about 0.1 and 0.75 feet per second, and preferably 0.15 to 0.5 feet per second. This is sufficient to maintain particles of an inert material, e.g., sand, having a particle size in the range of $-100$ to $+250$ mesh, and preferably $-140$ to $+200$ mesh in a fluidized condition without substantial transfer of the solid particulate material out of the reaction vessel through the upper exit pipe.

Solid ferrous chloride from the chlorinator or beneficiator is introduced at a point between the closed extremities of the vessel where it comes into contact with an oxygen containing gas. The reactions (1) and (2) that occur are as follows:

(1)  $FeCl_2 + \tfrac{1}{2}O_2 \rightarrow \tfrac{2}{3}FeCl_3 + 1/6 Fe_2O_3$ (2) 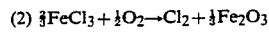 $\tfrac{2}{3}FeCl_3 + \tfrac{1}{2}O_2 \rightarrow Cl_2 + \tfrac{1}{3}Fe_2O_3$ These two reactions are carried out in the fluid bed to produce elemental chlorine, ferric oxide and a very small amount of unreacted ferric chloride which is recycled into the fluidized bed. Surprisingly, both reactions occur in the one stage of passage through the bed, e.g. continuously and at virtually the same time, without the need for the complexity or expense of a second stage reactor for the second reaction.

In accordance with this invention, the solid oxide formed in the oxidizer is removed in two ways:

(a) The ferric oxide that is coated on the surface of the fluidized inert medium is removed by bleeding off a part of the fluidized bed in a continuous manner.

(b) The ferric oxide that is in the form of discrete particles is separated from the gaseous stream exiting from the top of the reactor by means of a cyclone separator. This is carried out at a temperature which is above the dew point of ferric chloride. Thereafter, the gaseous effluent stream can be quenched with liquid titanium tetrachloride spray to form solid ferric chloride and gaseous $TiCl_4$ and $Cl_2$. The small amount of ferric chloride is fed back into the oxidizer. The titanium tetrachloride used as a quenching agent is condensed out of the chlorine stream before the chlorine is recycled to the beneficiator or chlorinator reactor depending upon which is being used.

Apparatus of the type above described is shown in diagrammatic and schematic form in FIGS. 1-5.

As indicated above, it is beneficial to link the ferrous chloride oxidizer to an entrained flow chlorinator, a chlorinator, or a beneficiator, or a combination thereof. The raw material, iron chloride, will be predominately ferrous chloride which can be condensed at a higher temperature than ferric chloride. At the high melting temperature, the ferrous chloride reacts readily with oxygen to form gaseous chlorine and ferric oxide. This is an exothermic reaction; and, therefore, no extra heat is required. Ferrous chloride condenses at 674° C. and can be easily separated from the other low melting point metal chlorides. This is a benefit in removing impurities.

Referring now more particularly to FIG. 1, there is shown herein a ferrous chloride oxidizer 10 in a system which includes a primary chlorinator 12 and an entrained flow chlorinator 14. This kind of chlorinator system is described in detail in the patent to Bonsack U.S. Pat. No. 4,540,551 issued Sept. 10, 1985. In general, elemental chlorine gas is introduced into the bottom of the chlorinator 12 through a conduit 16 and ore, preferably mixed with coke, is introduced from the top of the chlorinator 12 through the conduit 18. The chlorinator 12 may be operated under fluidized bed conditions. The off-gas composed mainly of $TiCl_4$, carbon oxides, and entrained solid particulate is submitted to centrifugal separation in a cyclone separator. The vaporous titanium tetrachloride liquid is carried off through conduit 20, and the solid material composed of mainly ferric chloride is introduced into the bottom of the entrained flow reactor 14. Finely ground ore is introduced through the bottom of the reactor through a conduit 22, this portion of the ore charge being reduced in size to about 20 microns or less. Chlorine is introduced into the bottom of the entrained flow chlorinator 14 through a conduit 24 or a conduit 26, as will be later explained. The off-gas leaving the entrained flow chlorinator 14 through conduit 28 are submitted to centrifugal separation to remove $TiCl_4$ and solid ferrous chloride. The solid ferrous chloride passes through the conduit 30 into the oxidizer 10 near the bottom 32. As indicated above, the oxidizer 10 according to the present invention is provided with a fluidized bed of an inert material, i.e., a material inert to chlorine, such as silica sand or zirconia sand. The sand has a particle size of broadly in the range of $-100$ to $+250$ mesh, and preferably in the range of $-140$ mesh to $+200$ mesh. A gas flow of the order of 0.15 to 0.5 feet per second will maintain the sand in a fluidized state under a regime wherein little or no sand is carried out in the off-gas line 34. Air or other oxygen-containing gas is introduced into the bottom of the oxidizer 10 through a conduit 36.

The oxidizer is operated under conditions such that the ferrous chloride is in a solid state and is placed in contact with gaseous oxygen. The temperature is maintained in the range of from about 600° to 650° C., i.e., below the FeCl$_2$ melting point of 674° C. Reactions 1 and 2 above occur within the oxidizer resulting in the formation of ferric oxide and chlorine gas. As indicated above, some ferric chloride may be produced in the course of the reaction. The off-gases are passed through the conduit 34 into a centrifugal separator 38. Iron oxide is removed either as solid particulate or in association with particles of sand through the bottom of the cyclone separator while gaseous components are carried off through the conduit 40. A quenching amount of titanium tetrachloride is introduced into the conduit 40 through a line 42. The temperature of introduction is such that the ferric chloride is solidified while the titanium tetrachloride is maintained in a gaseous state. This, along with the elemental chlorine, exits the cyclone separator 44 through a conduit 46. The chorine and quenching liquid titanium tetrachloride are conducted through a downwardly extending leg 48 into a separation and collection tank 50. Chlorine is removed from the upper portion of the collection tank through a conduit 52 and recycled to the entrained flow chlorinator 14 through the conduit 26. Liquid titanium tetrachloride is pumped by means of a pump 54 through a heat exchanger 56 where it is cooled to a temperature sufficient to freeze out any suspended ferrous or ferric chloride from the off-gas stream. The pump 54 is driven by a motor M.

Gases exiting from the chlorinators and containing TiCl$_4$ at an elevated temperature and carbon oxides are collected in pipe line (header) 57 and through a descending leg 58 into a condenser 60 leading to a separation tank 62. Gaseous material is exhausted through the conduit 64 and is composed largely of carbon oxides. The now liquified TiCl$_4$ leaves the tank 62 through a conduit 66 and is pumped through pump 68 through a heat exchanger 70 back into a header line 72 where it is distributed for quenching purposes as indicated above.

Figure 2:
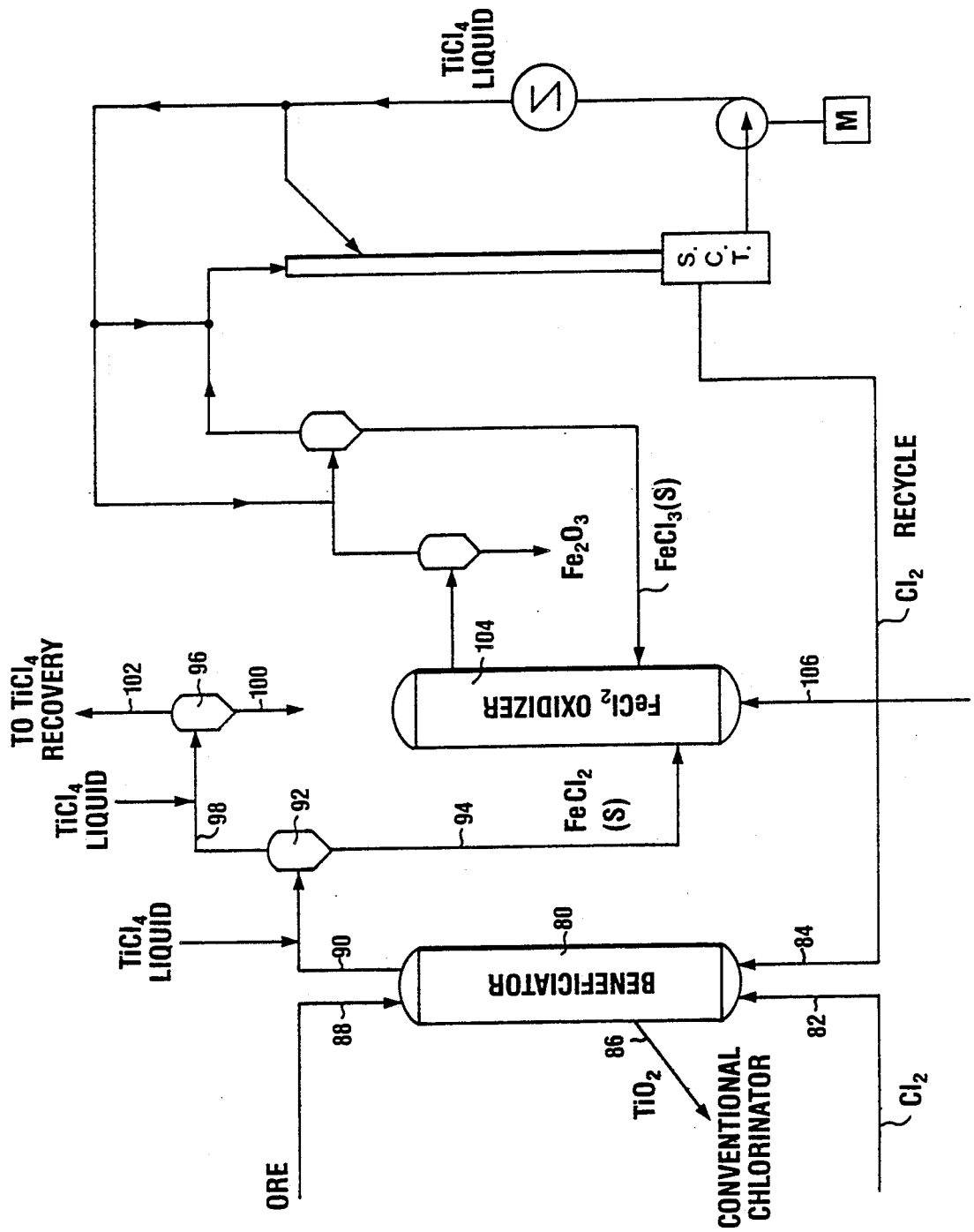
FIG. 2 is a diagrammatic and schematic illustration of an apparatus showing a ferrous chloride oxidizer used in a beneficiation-chlorinated process.

FIG. 2 is a somewhat different apparatus which also depends upon a chlorination of a titaniferous ore such as ilmenite. However, in the illustrated case, the ore is merely beneficiated in a beneficiation reactor 80 operated under conditions wherein the iron content of the titaniferous ore is reacted with chlorine to form iron chlorides, without the formation of substantial amounts of TiCl$_4$. Chlorine is introduced into the bottom of the tank through a line 82 or recycled into the bottom of the tank through a line 84. Titanium dioxide is taken off from the side of the tank through an outlet 86. The ore is introduced through the top of the tank through an inlet 88, and the off-gases leave the tank through the conduit 90. The exhaust gases are introduced into a cyclone separator 92 wherein the solid particles of FeCl$_2$ are isolated and removed in a descending leg 94. The gaseous products, including carbon oxides, some TiCl$_4$, and some iron chlorides, are introduced into a cyclone separator 96 through a conduit 98. The solid material is removed through an outlet 100, and the gaseous components through an outlet 102.

In this particular process, the resulting ferrous chloride is again introduced into a ferrous chloride oxidizer 104 which is operated in exactly the same manner as ferrous chloride oxidizer 10 as shown in FIG. 1. The construction and mode of operation of the ferrous chloride oxidizer tank is essentially the same as previously discussed.

Figure 3:
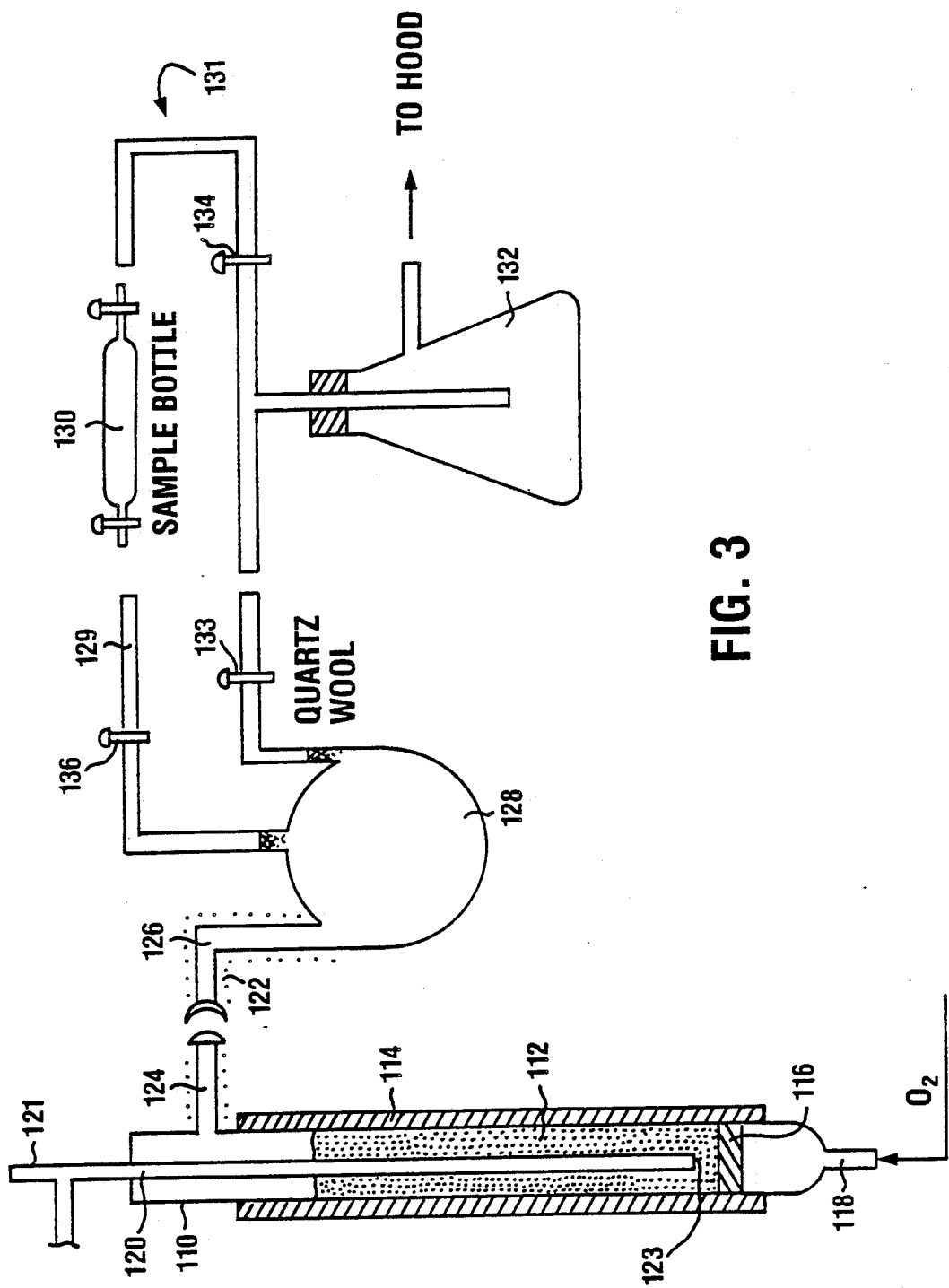
FIG. 3 is a diagrammatic and schematic illustration of laboratory apparatus used in ferrous chloride oxidation.

Referring now more particularly to FIG. 3, there is shown a test apparatus for the oxidation of ferrous chloride to elemental chlorine.

Test oxidations were carried out in 1½" diameter quartz reactor 110 having disposed therein a silica sand bed having a particle size in the range of −140 mesh to +200 mesh. The sand bed is indicated by the number 112. The tube was heated by means of an electric furnace 114 surrounding the tube. In the bottom of the tube there was provided a perforated plate 116 through which an oxygen-containing gas, e.g. elemental oxygen, entering through the inlet 118 passes and generates a fluidized sand bed. Solid ferrous chloride was introduced by a screw feeder 120 through a vertical quartz 121 fitted concentrically with respect to the reactor 110 and having its outlet 123 located 3 inches above the bottom of the sand bed. The screw feeder 120 was equipped with a vibrator, an agitator, and appropriate plumbing for the introduction of a nitrogen purge which also served to equalize the pressure in the feeder. Oxygen and carbon dioxide were introduced into the reactor 110 through the inlet 118. Carbon dioxide served as a tracer for the gas chromatograph.

A type S thermocouple in a quartz thermowell (not shown) was placed at the center of the sand bed 112. Heating wire 122 was used to maintain the temperature of the upper section of the reactor 110 above the level of the fluid bed, the side arm 124 and the elbow 126 before the receiving flask 128 to prevent premature condensation of the ferric chloride.

The receiving flask 128 was provided with a valved outlet 129 leading to a removable sample bottle 130 through a closed circuit line 131 which returned to the flask 128. While a sample was being collected in sample bottle 130, valve 133 was closed. When the sample bottle 130 was removed from the line, valves 133 was closed. The effluent gases from the flask 128 were then conducted through a sodium hydroxide solution to scrub out any chlorine gas.

The following example gives the rates of introduction of material and the conversions obtained in an apparatus such as shown in FIG. 3. Table 1 compares the equilibrium constants in the oxygen of ferrous chloride to chlorine at temperatures in the range of 1,000° C. to 600° C. Table II shows the composition of recycled chlorine gas.

TABLE I

COMPARISON OF EQUILIBRIUM CONSTANTS
(OXIDATION OF FeCl$_2$ TO CHLORINE
AT 1000° C. TO 600° C.)

| REACTION | TEMPERATURE | Kp | % CONVERSION |
|---|---|---|---|
| FeCl$_2$ → FeCl$_3$ → Cl$_2$ | 1000° C. | 28.98 | 58.5 |
|  | 800° C. | 2.14 × 10$^3$ | 85.0 |
|  | 700° C. | 7 × 10$^4$ | 94.0 |
|  | 650° C. | 1.7 × 10$^6$ | 97.5 |
|  | 600° C. | 4 × 10$^6$ | 98.0 |

TABLE II

COMPOSITION OF RECYCLED CHLORINE GAS

| GAS | MOLE/MOLE TiCl$_4$ | MOLE % |
|---|---|---|
| TiCl$_4$ | 0.033 | 4.3 |
| Cl$_2$ | 0.590 | 76.8 |
| O$_2$ | 0.085 | 11.1 |
| CO$_2$ | 0.060 | 7.8 |
|  | 0.768 | 100.0 |

Figure 4:
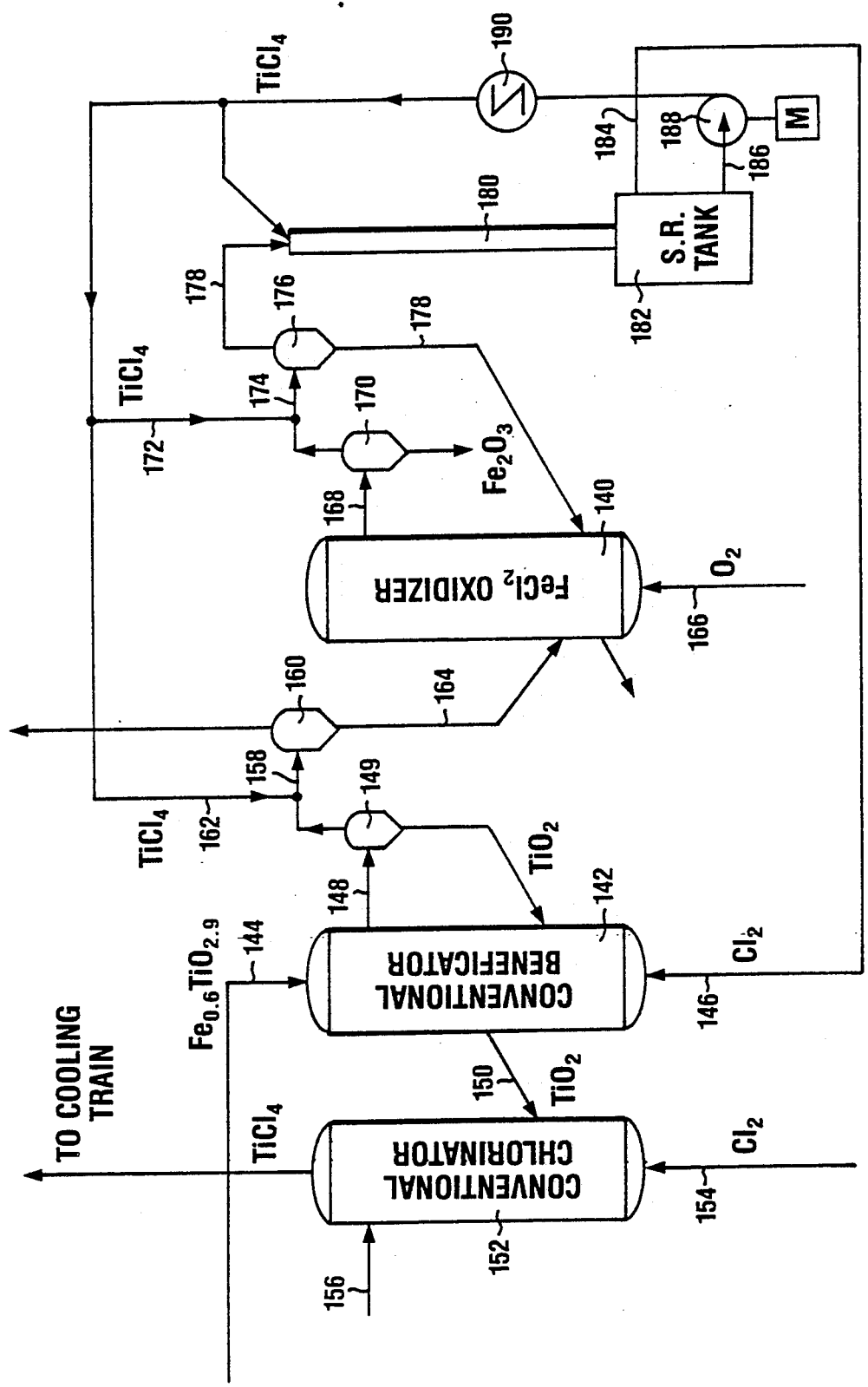
FIG. 4 is a diagrammatic and schematic illustration of an apparatus including a ferrous chloride oxidizer used in combination with a beneficiation-chlorination process.

FIG. 4 shows a ferrous chloride oxidizer 140 used in a combined beneficiation—chlorination process.

As shown in FIG. 4, ilmenite ore is introduced into the top of a conventional beneficiator through a conduct 144. Chlorine gas is introduced into the bottom of the beneficiator through an inlet 146 and reacts with the iron content of the ore to form ferrous chloride and crude titanium dioxide. This mixture is removed from the beneficiator through a conduit 148 into a cyclone separator 149 wherein the gaseous ferrous chloride and any entrained titanium dioxide are isolated from each other by centrifugal means. The crude titanium dioxide is returned to the conventional beneficiator 142.

A portion of the crude titanium dioxide is then introduced through a conduit 150 into a conventional fluid bed chlorinator 152. Chlorine gas is introduced through the bottom of the chlorinator 152 through an inlet conduit 154. Carbon is introduced into the conventional chlorinator 152 through an inlet 156. The off-gas is titanium tetrachloride which is then directed to a cooling train, not shown. The $FeCl_2$ formed in the conventional beneficiator 142 and separated from the crude titanium dioxide in the cyclone separator 149 is carried by means of a conduit 158 to a cyclone separator 160. Prior to entry into the cyclone separator 160, the gaseous ferrous chloride is quenched with cooling liquid $TiCl_4$ through an inlet 162. This causes the ferrous chloride to solidify, whereby it is conducted as solid particulate ferrous chloride through the conduit 164 into the lower portion of the ferrous chloride oxidizer 140. The ferrous chloride oxidizer is the same as the ferrous chloride oxidizers as shown in FIGS. 1 and 2 and contains a fluidized bed of inert solid particulate material, e.g., sand. This mixture is maintained in a fluid state by a flow of an oxygen-containing gas through an inlet 166. The chlorine gas formed in the oxidizer 140 is removed through a conduit 168 along with particulate ferric oxide. The particulate ferric oxide and chlorine gas are separated in a cyclone separator 170. The off-gas from the cyclone separator 170 is quenched with $TiCl_4$ through an inlet conduit 172, and the resulting mixture passed by means of a conduit 174 into a cyclone separator 176. Solid $FeCl_3$ is conducted by means of a conduit 178 into the bottom of the $FeCl_2$ oxidizer 140 for recycling and exposure to the oxygen-containing gas. The off-gas from the cyclone separator 176 is conducted to a receiver through a conduit 178 which passes through a condensing leg 180 into a receiving tank 182 wherein the chlorine and liquid $TiCl_4$ are isolated from one another. The chlorine exits from the tank through a line 184 and is recycled to the inlet 146 leading into the bottom of the conventional beneficiator 142. The liquid $TiCl_4$ is removed from the receiver tank through a line 186 and pumped by means of pump 188 through a heat exchanger 190 where it is cooled to a temperature for quenching purposes in lines 158 and 174 as described above.

Figure 5:
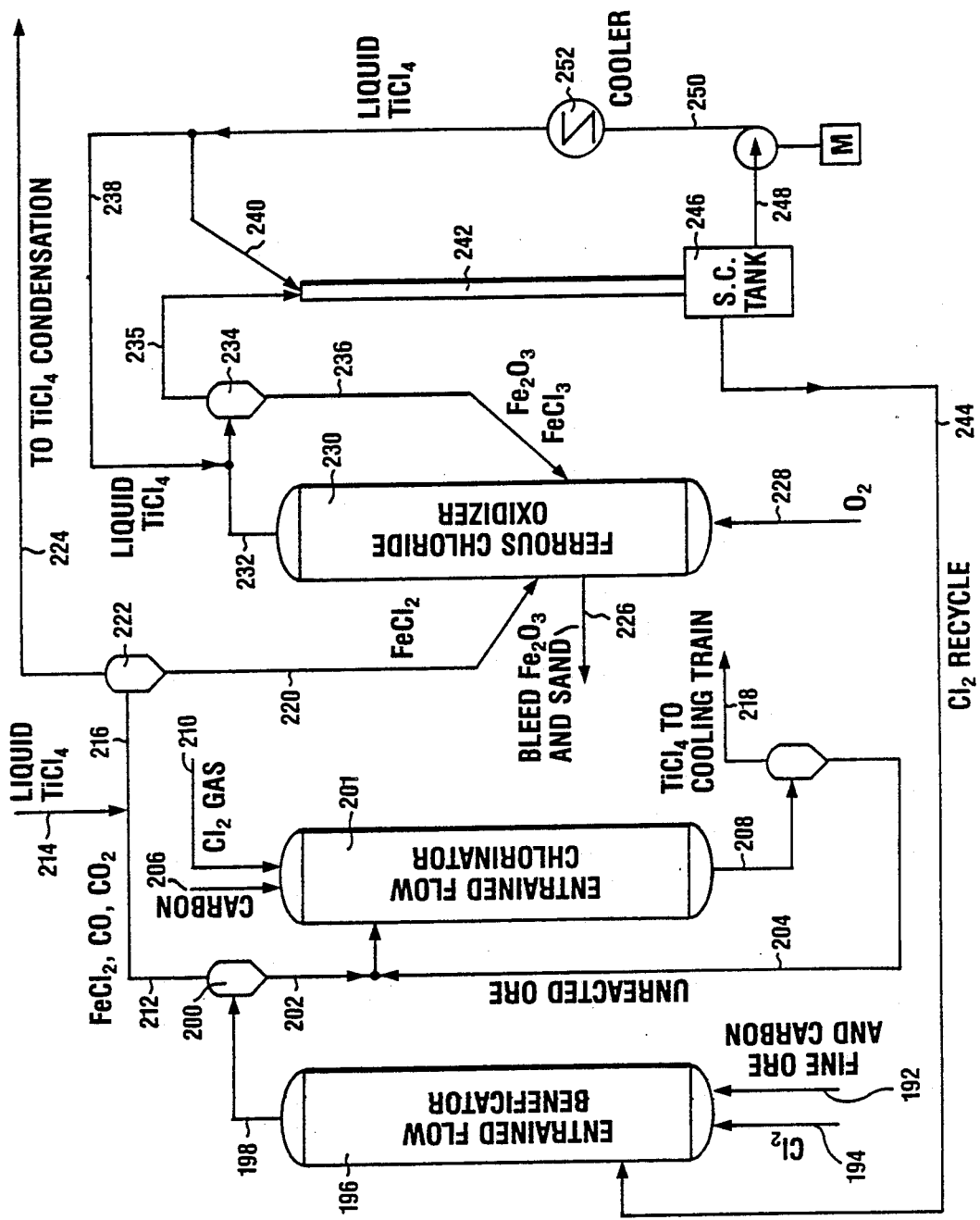
FIG. 5 is a diagrammatic and schematic illustration of an apparatus including a ferrous chloride oxidizer used in a combination with an entrained-flow beneficiation-chlorination process.

FIG. 5 shows a ferrous chloride oxidizer 196 used in a combined entrained-flow beneficiation-chlorination process. This example is good for very fine ilmenite ore, which is not suitable for fluid bed reactors.

As shown in FIG. 5, fine ilmenite ore and carbon are introduced into the bottom of an entrained-flow beneficiator 196 through a conduit 192. Chlorine gas is introduced into the bottom of the beneficiator through an inlet conduit 194 and reacts with the iron content of the ore to form ferrous chloride and crude titanium dioxide. This mixture is removed from the beneficiator through a conduit 198 and into a cyclone separator 200 wherein the gaseous ferrous chloride and titanium dioxide are separated by centrifugal means. The crude titanium dioxide is introduced into the top of the entrained-flow chlorinator 201 through a conduit 202 after it is combined with the unreacted ore.

Beneficiated crude titanium dioxide is then introduced through a conduit 202 into the chlorinator 201. Chlorine gas is introduced through the top of the chlorinator 201 through an inlet conduit 210. Carbon is introduced into the entrained-flow chlorinator through an inlet 206. The off-gas is titanium tetrachloride, which is then directed to a cooling train, not shown. The $FeCl_2$ formed in the entrained-flow beneficiator 196 and separated from the crude titanium dioxide in the cyclone separator 200 is carried by means of a conduit 216 to a cyclone separator 222. Prior to entry into the cyclone separator 222, the gaseous ferrous chloride is quenched with cooling liquid $TiCl_4$ introduced through an inlet 214. This causes the ferrous chloride to solidify, whereby it is conducted as solid particulate ferrous chloride through the conduit 220 into the lower portion of the ferrous chloride oxidizer which is the same as the ferrous chloride oxidizer as shown in FIGS. 1, 2 and 4 and contains a fluidized bed of inert solid particulate material, e.g., sand. This mixture is maintained in a fluid state by a flow of an oxygen-containing gas through an inlet 228. The chlorine gas formed in the oxidizer 230 is removed through a conduit 232 along with particulate ferric oxide. The particulate ferric oxide and chlorine gas is quenched with $TiCl_4$ through an inlet conduit 238 and the resulting mixture passed by means of a conduit 232 into a cyclone separator 234. Solid $FeCl_2$ is conducted by means of a conduit 220 into the bottom of the $FeCl_2$ oxidizer 230 for recycling and exposure to the oxygen-containing gas. The chlorine off-gas from cyclone 234 is conducted to a receiver through a conduit 235 which passes through a condensing leg 242 into a receiving tank 246 wherein the chlorine and liquid $TiCl_4$ are isolated from one another. The chlorine exits from the tank through a line 244 and is recycled to the inlet line leading into the bottom of the entrained-flow beneficiator 196. The liquid $TiCl_4$ is removed from the receiver tank through a line 248 and pumped by means of pump 250 through a heat exchanger 252 where it is cooled to a temperature for quenching purposes in line 238 and 240 as described above.

It can be seen, therefore, that the recovery of chlorine from ferrous chloride by means of an oxidizer utilizing a fluid bed of inert particulate material is adaptable to a number of situations where the chlorine is used either as a beneficiating agent for a titaniferous ore or as a source of chlorine gas for conducting chlorination of ilmenite or beneficiated ilmenite ore.

What is claimed is:

1. A single stage process for recovering elemental chlorine from ferrous chloride which comprises:
   (a) introducing a product containing ferrous chloride and less than twelve percent carbon by weight into a reactor containing a fluidized bed of solid inert particulate material which is substantially inert to chlorine and which is composed of particles having a particle size range of from about $-100$ mesh to about $+250$ mesh;
   (b) oxidizing the ferrous chloride in the product to elemental chlorine and ferric oxide in the presence of the fluidized inert particulate material with an oxygen containing gas at a temperature below the melting point of ferrous chloride and above about 500° C., so that at least some of the ferric oxide formed adheres to some of the inert particulate material;

(c) removing a portion of the inert particulate material with the adhered ferric oxide and supplying fresh inert particulate material to the reactor; and (d) isolating the elemental chlorine.

2. A process as defined in claim 1 wherein at least some of the ferric oxide is removed in the form of discrete particles at a temperature above 315° C.

3. A process as defined in claim 1, which is further characterized by the step of quenching off-gases from the reactor with liquid $TiCl_4$ to yield solid ferric chloride and gaseous $TiCl_4$ and elemental chlorine.

4. A process as defined in claim 3 wherein the gaseous $TiCl_4$ is condensed to liquid $TiCl_4$ to isolate as a gas, elemental chlorine.

5. A process as defined in claim 1, wherein the inert particulate material is zirconia sand.

6. The process of claim 1, wherein the product of step (a) contains less than five percent carbon by weight.

7. A process as defined in claim 1, wherein the oxygen-containing gas enters through a bottom inlet port in the reactor at about 0.1 to 0.75 feet per second.

8. The process of claim 7 wherein the oxygen containing gas enters through the inlet port at about 0.15 to 0.5 feet per second.

* * * * *